United States Patent
Hsu et al.

(10) Patent No.: US 12,387,511 B2
(45) Date of Patent: Aug. 12, 2025

(54) AUTOMATIC SYSTEM AND METHOD FOR DOCUMENT AUTHENTICATION USING PORTRAIT FRAUD DETECTION

(71) Applicant: Idemia Identity & Security USA LLC, Reston, VA (US)

(72) Inventors: Rein-Lien Hsu, Edison, NJ (US);
Brian Martin, McMurray, PA (US)

(73) Assignee: IDEMIA PUBLIC SECURITY FRANCE, Courbevoie (FR)

( * ) Notice: Subject to any disclaimer, the term of this patent is extended or adjusted under 35 U.S.C. 154(b) by 326 days.

(21) Appl. No.: 18/062,963

(22) Filed: Dec. 7, 2022

(65) Prior Publication Data
US 2024/0193970 A1    Jun. 13, 2024

(51) Int. Cl.
| | |
|---|---|
| *G06V 30/418* | (2022.01) |
| *G06V 10/24* | (2022.01) |
| *G06V 10/44* | (2022.01) |
| *G06V 10/48* | (2022.01) |
| *G06V 10/75* | (2022.01) |
| *G06V 10/764* | (2022.01) |
| *G06V 20/00* | (2022.01) |
| *G06V 30/413* | (2022.01) |
| *G06V 30/414* | (2022.01) |

(Continued)

(52) U.S. Cl.
CPC ............ *G06V 20/95* (2022.01); *G06V 30/414* (2022.01); *G06V 30/418* (2022.01); *G06V 40/172* (2022.01)

(58) Field of Classification Search
CPC .... G06V 20/95; G06V 30/414; G06V 30/418; G06V 40/172; G06V 40/40; G06V 10/242; G06V 10/44; G06V 10/48; G06V 10/751; G06V 10/753; G06V 10/764; G06V 30/413; G06V 40/161
See application file for complete search history.

(56) References Cited

U.S. PATENT DOCUMENTS

| | | | |
|---|---|---|---|
| 10,899,160 B1 * | 1/2021 | Jones | ............... B42D 25/328 |
| 11,030,449 B2 | 6/2021 | Jarvis et al. | |

(Continued)

FOREIGN PATENT DOCUMENTS

| | | | | |
|---|---|---|---|---|
| CN | 111027504 A | * | 4/2020 | ......... G06K 9/00228 |
| CN | 112597808 A | | 4/2021 | |

(Continued)

OTHER PUBLICATIONS

Liu et al., SSD: Single Shot MultiBox Detector,, UNC Chapel Hill, Abstract (Year: 2016).*

(Continued)

*Primary Examiner* — John Villecco
*Assistant Examiner* — Kyla Guan-Ping Tiao Allen
(74) *Attorney, Agent, or Firm* — Armstrong Teasdale LLP

(57) ABSTRACT

An authentication processing system includes a memory storing a portrait fraud detection application, and a processing unit coupled with the memory and configured to execute the portrait fraud detection application. The portrait fraud detection application, when executed, configures the processing unit to receive a capture of a document including a portrait photo and at least one overlay, detect a face in the portrait photo among the at least one overlay in the capture, and determine the portrait photo is fraudulent; and initiate an indication the document is fraudulent.

20 Claims, 7 Drawing Sheets

(51) Int. Cl.
  *G06V 40/16*  (2022.01)
  *G06V 40/40*  (2022.01)

(56) References Cited

U.S. PATENT DOCUMENTS

| | | | |
|---|---|---|---|
| 11,279,164 | B1 | 3/2022 | Hsu et al. |
| 2004/0050931 | A1* | 3/2004 | Ono .................. B42D 25/333 |
| | | | 235/380 |
| 2006/0157559 | A1 | 7/2006 | Levy et al. |
| 2018/0068173 | A1* | 3/2018 | Kolleri .................. G06Q 10/10 |
| 2019/0180086 | A1* | 6/2019 | Zhang .................. G06V 10/50 |
| 2020/0226405 | A1 | 7/2020 | Huber, Jr. et al. |
| 2021/0158036 | A1* | 5/2021 | Huber, Jr. ............ G06V 30/413 |
| 2022/0092609 | A1* | 3/2022 | Giera .................. G06V 10/82 |
| 2022/0318597 | A1* | 10/2022 | Yu .......................... G06F 21/34 |

FOREIGN PATENT DOCUMENTS

| | | |
|---|---|---|
| CN | 114820476 A | 7/2022 |
| EP | 4141830 A1 | 3/2023 |
| JP | 2019204293 A | 11/2019 |
| WO | 2021189101 A1 | 9/2021 |

OTHER PUBLICATIONS

Liu et al., "SSD: Single Shot MultiBox Detector," ECCV, pp. 21-37, 2016.

Open CV/OpenCV, "How to Train Face Detector.txt," retrieved from https://github.com/opencv/opencv/blob/4.0.0-beta/samples/dnn/face_detector/how_to_train_face_detector.txt on Jul. 5, 2022.

Gao et al., "Robust Template Matching via Hierarchical Convolutional Features from a Shape Biased CNN," Department of Informatics, King's College, 2021.

In et al., "Feature Pyramid Networks for Object Detection," Facebook AI Research (FAIR) Cornell University and Cornell Tech, 2017.

Dumoulin et al., "A guide to convolution arithmetic for deep learning," MILA, Universite de Montreal AIRLab, Politecnico di Milano, Jan. 12, 2018.

Sebastian Gonzalez et al., "Hybrid Two-Stage Architecture for Tampering Detection of Chipless ID Cards", IEEE Transactions on Biometrics, Behavior, and Identity Science, vol. 3, No. 1, Sep. 15, 2020, pp. 89-100.

European Extended Search Report, Application No. 23209920.0, dated Jun. 21, 2024, 29 pps.

* cited by examiner

AUTOMATIC SYSTEM AND METHOD FOR DOCUMENT AUTHENTICATION USING PORTRAIT FRAUD DETECTION

TECHNICAL FIELD

The field of the disclosure relates generally to systems for authenticating documents and, more specifically, systems and methods for authenticating a document using portrait fraud detection.

BACKGROUND OF THE INVENTION

Many regular transactions between individuals, or between an individual and a business, government agency, or other entity, require such an individual to present a document that identifies the individual. More often than not, the document is a credential document having a portrait, or picture, of the individual, such as, for example, a passport, a state-issued driver's license, or other government-issued credential document. When presented, an authentic document readily identifies the holder by an observable match (or not) between the portrait and the holder. A fraudulent document, however, aims to deceive the interrogating individual or entity into trusting what otherwise appears to be an authentic document to falsely identify the holder. Detecting a fraudulent document has historically been the province of highly skilled and trained eyes, i.e., manual inspection by another person.

As the volume of transactions multiplies and shifts more and more to an on-line or mobile-based interaction, the demand for document authentication is proliferating equally. Moreover, a skilled adversary, i.e., one who endeavors to produce fraudulent documents, has ever increasingly sophisticated tools at their disposal, rendering manual inspectors significantly disadvantaged. For example, an element of a fraudulent document is often a replaced portrait photo for the holder of the fraudulent document. When presented such a fraudulent document, the inspecting individual or entity can efficiently identify the document as a fraud if the replaced portrait is detected. However, such detection has become difficult to achieve for individuals and authentication processing systems, because a replaced portrait photo is often imperceptible to the human eye and the detection of subtle features common in fraudulent documents is not easily articulated in software or algorithms.

SUMMARY OF THE INVENTION

In one aspect, an authentication processing system is provided. The authentication processing system includes a memory storing a portrait fraud detection application, and a processing unit coupled with the memory and configured to execute the portrait fraud detection application. The portrait fraud detection application, when executed, configures the processing unit to receive a capture of a document including a portrait photo and at least one overlay, detect a face in the portrait photo among the at least one overlay in the capture, and determine the portrait photo is fraudulent; and initiate an indication the document is fraudulent.

In another aspect, a method of detecting a fraudulent portrait photo in a document is provided. The method includes receiving a capture of a document including a portrait photo, detecting the portrait photo in the capture, determining the portrait photo is fraudulent, and initiating an indication the document is fraudulent.

In yet another aspect, a method of detecting a fraudulent portrait photo boundary in a document is provided. The method includes rendering-flat the document, computing edges of a portrait photo within the document, computing candidate boundary lines from the edges; computing a portrait frame from the candidate boundary lines, and computing a fake boundary confidence value for the portrait frame, the fake boundary confidence value exceeding a threshold to determine the portrait photo is fraudulent.

DETAILED DESCRIPTION

Embodiments of the systems and methods disclosed herein facilitate authentication of a document having a portrait photo, such as, for example, a credential document. More specifically, a document is authenticated by passing one or more portrait fraud detection checks, i.e., a fraudulent portrait photo is not detected. A fraudulent portrait photo may be detected by (a) detecting a ghost photo on the document does not match a portrait photo on the document, (b) detecting boundary discontinuities in a portrait photo on the document, or (c) detecting a portrait profile does not match a template portrait profile for the document type, or any combination thereof.

At least some credential documents include a "ghost photo" overlayed on the face of the credential document in a manner that is observable by an individual to whom the document is presented. Under ideal circumstances an authentication processing system evaluates a ghost photo, which is generally a duplicate of the portrait photo with resizing or other modifications, using conventional facial recognition algorithms. In practice, the ghost photo is a visible feature often combined with additional overlaid text, holograms, or security protection patterns on the credential document. The additional overlays often obscure the ghost photo itself, rendering conventional authentication processes unreliable. For example, a given authentication process may cue on an overlay instead of the underlying ghost photo, resulting in an inability to identify the ghost photo and generating a false authentication, or a failure to authenticate a genuine document. Consequently, conventional facial recognition algorithms experience reduced performance, correctly detecting as few as 60% of faces in ghost photos. Likewise, conventional facial recognition matching algorithms and image template matching algorithms perform poorly when ghost photos are presented with additional overlays.

Figure 1:
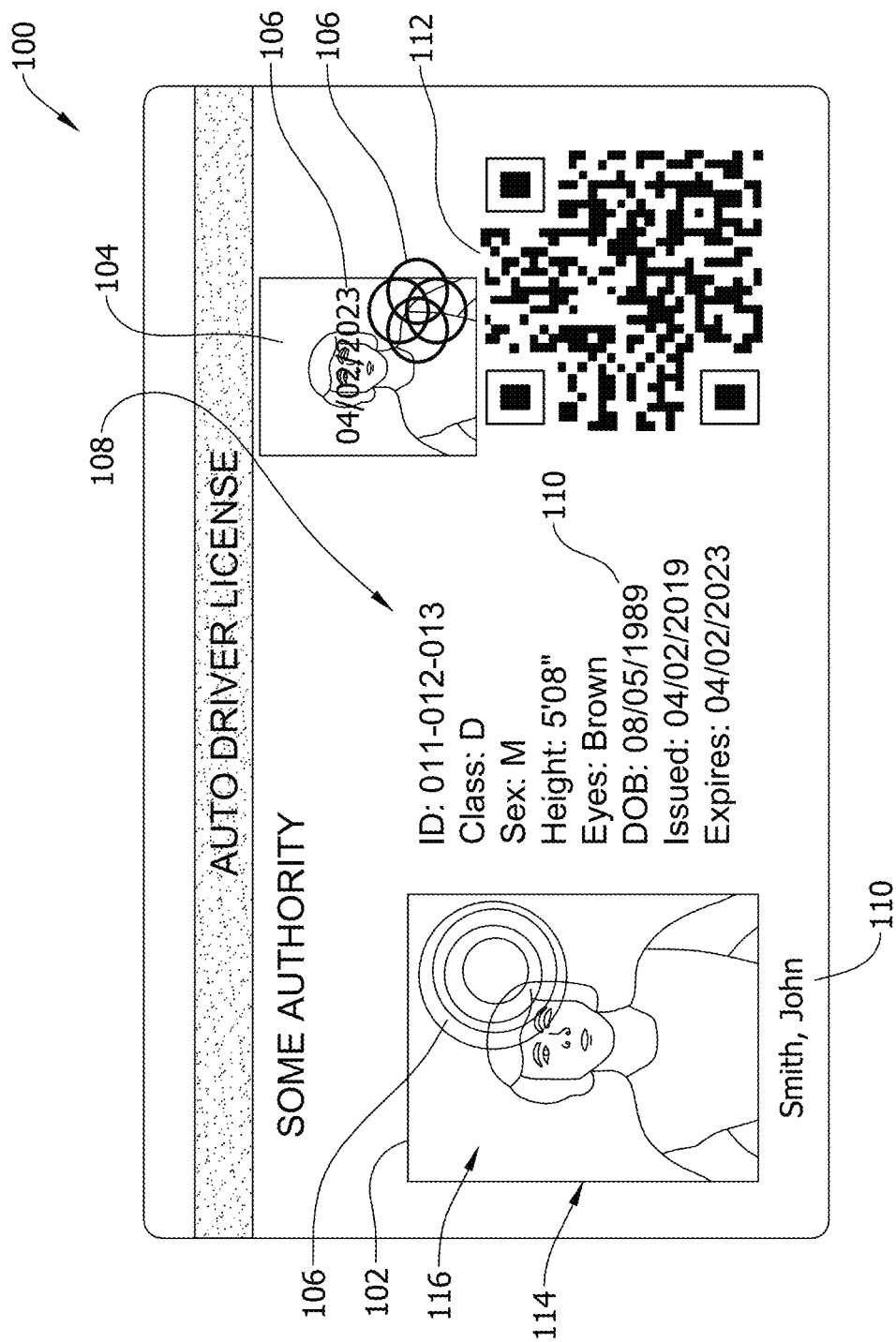
FIG. 1 is a diagram of an example document having a portrait photo.

FIG. 1 is a diagram of an example document 100 having a portrait photo 102 in addition to an overlaid ghost photo 104 and at least one additional overlay 106. The additional overlay 106 may include text, one or more holograms, or one or more other security patterns. Document 100 is illustrated as an automobile driver's license issued, for example, by a state or other government agency for a state. In alternative embodiments, document 100 may include a passport, non-driver's license, or other credential document issued by a state government, the federal government, or other government agency.

Ghost photo 104 is illustrated as a duplicate of portrait photo 102 but reduced in size. In alternative embodiments, ghost photo 104 may include a duplicate of equal or greater size, a rotated aspect, or other modification relative to portrait photo 102. Document 100 includes demographic data 108 including certain elements of personal identifiable information (PII) 110.

Document 100 includes a security feature 112. Security feature 112 includes one or more graphics or markings that encode various data, such as confidential data, public data, or at least some elements of demographic data 108 printed on the face of document 100. Security feature 112 may include a machine readable graphic that enables a reading device or other authentication processing system having an appropriate private or public encryption key to decode security feature 112 and gain access to the encoded data. The encoded data may ultimately be the object of a given transaction. Alternatively, the encoded data may be employed in authenticating document 100 or the holder.

Overlays 106 are illustrated as elements of text or symbols that obscure ghost photo 104 or portrait photo 102 to some extent, for example, either partially or completely. Overlays 106 may include any text, symbol, pattern, texture, or the like that appears at least partially over, and thereby obstructs visible or machine readability of, portrait photo 102 or ghost photo 104. FIG. 1 illustrates one example of document 100 in which both portrait photo 102 and ghost photo 104 are partially obscured by overlays 106. In alternative embodiments, overlays 106 may obscure only portrait photo 102 or only ghost photo 104. Likewise, overlays 106 may completely cover and obscure one or both of portrait photo 102 and ghost photo 104.

When portrait photos, such as portrait photo 102, are replaced in fraudulent documents, the replaced portrait often exhibit discontinuities in their boundaries 114. For example, boundaries 114 may include "hairy" or "zig-zag" textures, or curved edges resulting from manual cutting operations. Boundaries 114 may also appear with weak edges that are blended with the document background, making them difficult to detect.

Similarly, replaced portrait photos may include incorrect background colors 116, missing or incorrect security graphics or other features for a given document type, e.g., for a given issuing authority. While visual inspection by a human may reliably identify these "profile" characteristics, authentication processing systems generally cannot. For example, conventional authentication processing systems do not process color data.

The disclosed authentication processing systems and methods perform portrait fraud detection by (a) detecting faces in the portrait and ghost photos and matching them, (b) checking if the portrait photo has been physically substituted via rough cutting boundaries, (c) creating a portrait profile template and comparing it against a stored profile for the document type, or a combination of two or more of the above. The disclosed systems and methods perform portrait fraud detection in a manner that is insensitive to or independent of personal identifiable information that otherwise appears on credential documents, yielding a more reliable subject-independent check that can be applied to any document. Moreover, the disclosed authentication processing systems and methods may be trained by modern convolutional neural networks for efficient speed and for robust accuracy in fraud detection rates, while maintaining a false alarm rate as low as 1% on normal genuine documents.

As used herein, the term "document" may include any physical or digital form of credential document, identification, or other documentation associated with a user or holder that may be used to identify the user or holder by a portrait photo. For example, in at least some embodiments, documents may include any form of photo identification (photo ID), such as a driver's license, passport, or other government or non-government issued photo ID. Likewise, in some embodiments, documents may include transaction instruments, such as payment cards (e.g., credit and debit cards) having a portrait photo. In some embodiments, documents are digital user credentials, or digital ID, and may include digital wallet data and/or any other information stored on a memory device that can be used to identify a user by a portrait photo. Accordingly, documents may include, as described variously herein, both physical forms of identification, payment, and the like, as well as digital forms of the same.

As used herein, the term "validation" means confirming information contained or included in a document is valid. In some embodiments, validation may thus include confirming such information is accurate and current, or "up to date." Likewise, in at least some embodiments, validation may also include confirming information included in a document is not fraudulent and/or matches information contained in a secure storage system, or system of record, such as a secure backend system that maintains credentials for a plurality of users (e.g., a motor vehicles department system, a law enforcement system, a State Department system, a payment processor system, and the like).

As used herein, "authentication" means confirming an individual or user presenting a document is the real, or "authentic," owner of the document; or confirming a document itself is a real, or "authentic," document originating from an issuing authority such as a federal or state government, or agency thereof.

For example, authentication may include comparing a photograph or facial image of the user obtained from a biometric measurement device, such as a camera, to a photograph or facial image of the user contained in the system of record. Likewise, authentication may include comparing a fingerprint sample of the user obtained from a biometric measurement device, such as a camera and/or a fingerprint scanner, to a fingerprint sample contained in the system of record. Similarly, authentication of a document may include validating elements of document data against a system of record or, in combination with or independently, detecting whether a portrait photo on the document is authentic or fraudulent, e.g., modified or replaced.

Figure 2:
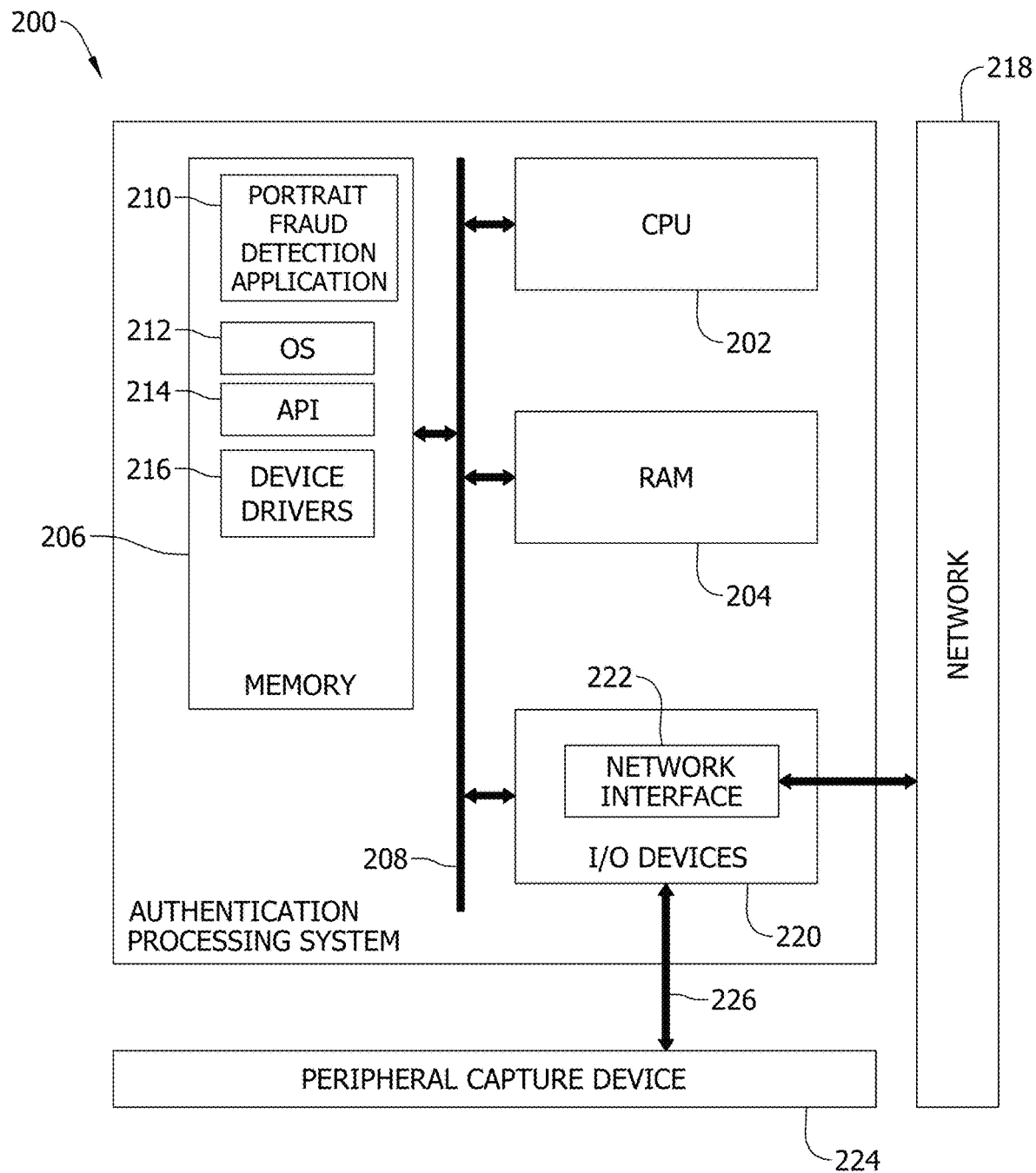
FIG. 2 is a block diagram of an authentication processing system.

FIG. 2 is a block diagram of an authentication processing system 200 for implementing document authentication and, more specifically, portrait fraud detection for credential documents, such as the document shown in FIG. 1. Authentication processing system 200 can include, for example, a desktop PC, server PC, a cloud computing platform (e.g., a VM), a mobile computing device (e.g., tablet computer or smartphone), document authentication system, or other suitable computing system. Authentication processing system 200 includes a central processing unit (CPU) 202 coupled to random access memory (RAM) 204 and memory 206 via a physical bus 208 that includes one or more memory bus, communication bus, or peripheral bus. Memory 206 is a computer-readable memory that includes a section storing a portrait fraud detection application 210, a section storing an operating system (OS) 212, a section storing application program interfaces (APIs) 214, and a section storing device drivers 216. In alternative embodiments, one or more section of memory 206 may be omitted and the data stored remotely. For example, in certain embodiments, portrait fraud detection application 210 may be stored remotely on a server or mass-storage device and made available over a network 218 to CPU 202.

Portrait fraud detection application 210 may include one or more sections, or blocks, of program code implementing one or more methods of portrait fraud detection. More specifically, portrait fraud detection application 210 may include program code implementing detection methods such as (a) detecting faces in the portrait and ghost photos and matching them, (b) checking if the portrait photo has been physically substituted via rough cutting boundaries, (c) creating a portrait profile template and comparing it against a stored profile for the document type, or a combination of two or more of the above.

Authentication processing system 200 also includes I/O devices 220, which may include, for example, a communication interface such as an Ethernet controller 222, or a peripheral interface for communicating with a peripheral capture device 224 over a peripheral link 226. I/O devices 220 may include, for example, a GPU for operating a display peripheral over a display link.

CPU 202 is configured by the execution of program code retrieved from memory 206, RAM 204, or loaded within CPU 202 itself. For example, CPU 202 is configured to perform portrait fraud detection by the execution of portrait fraud detection application 210. Likewise, CPU 202 is configured to transmit and receive data with peripheral capture device 224 by the execution of one or more device drivers 216.

Figure 3:
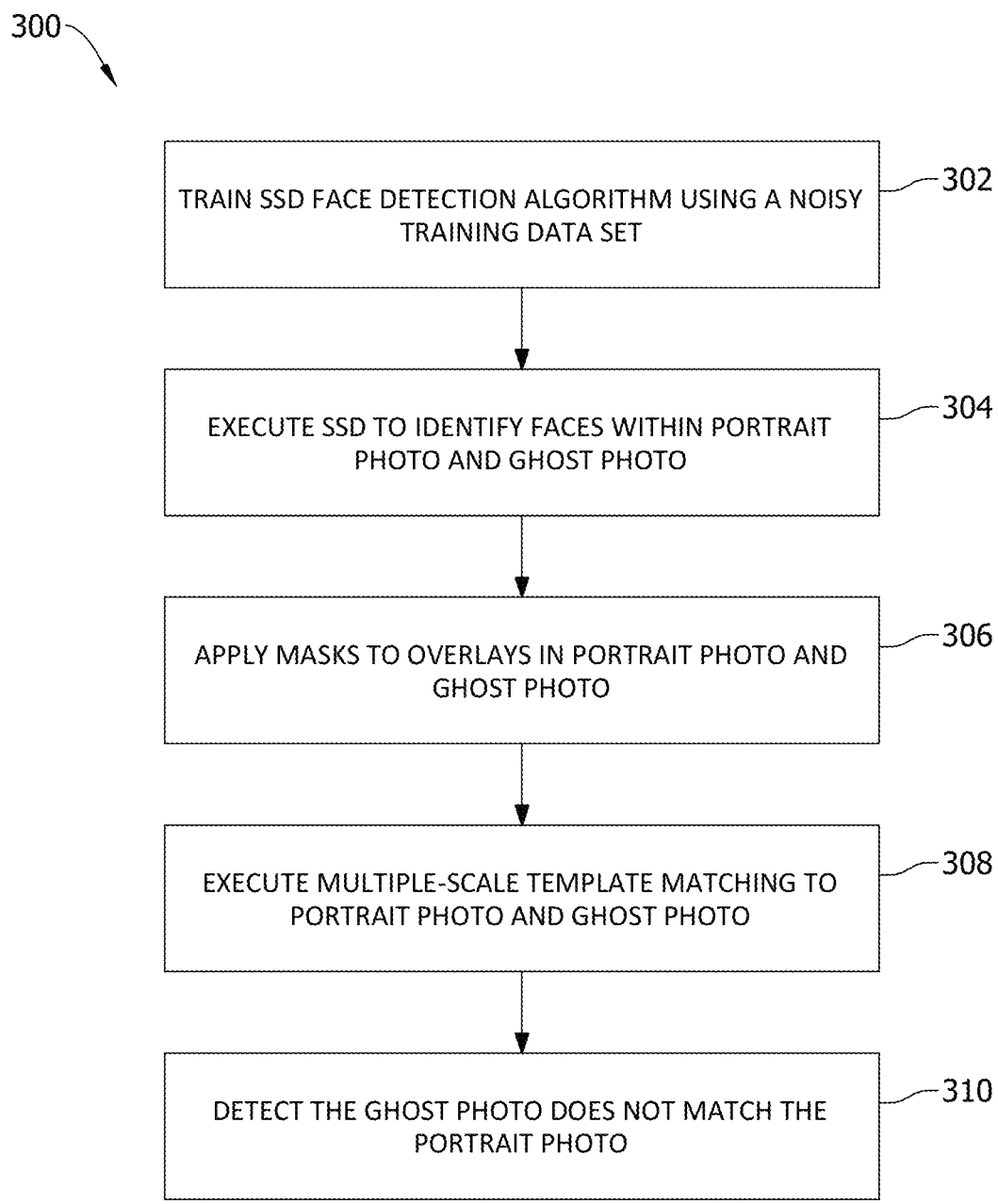
FIG. 3 is a flow diagram of an example method of detecting a ghost photo does not match a portrait photo on a document.

FIG. 3 is a flow diagram of an example method 300 of detecting a ghost photo does not match a portrait photo on a document. Such portrait fraud detection, or ghost check, can generally be divided into two steps. The first is detecting the portrait and ghost photos in a document using a face detection process. The second is conducting an image matching between the portrait and the ghost portrait, which may include different scales (i.e., size) or various overlays.

Face detection is implemented by an algorithm trained 302 to detected faces in a credential document. Training is achieved using a training data set, for example, a sample of credential documents or, more specifically, a sample of face images from portraits of credential documents. The size of the sample, i.e., the quantity of sample images, is configurable to tune the algorithm's performance. Conventional face detection algorithms are trained on a training data set generally including clean sample images, referred to herein as a noise-free training data set. In other words, the sample images depict faces only without overlays, such as text or security features, that introduce noise to the detection process. The disclosed face detection process is trained on a noisy training data set, which is to say the sample images are procured to include various aspects, scales, and overlays, in addition to conventional noise-free facial images. The disclosed noisy training set provides a diverse training and results in more reliable face detection up to and possibly exceeding a 90% detection rate.

The disclosed face detection process employs a single-shot detection (SSD) algorithm implemented using one or more programming libraries for computer vision, which are libraries for enabling a processing system to understand and interpret an image or video, akin to a human viewing that image or video. One example of a computer vision library is OpenCV (an open-source computer vision library). Other examples are SimpleCV, PyTorch, and BoofCV, among others. SSD algorithms use a trained image classification network (e.g., a convolutional neural network, or CNN) for feature extraction and generation of feature maps, and one or more additional convolutional layers for object classification and detection. Notably, SSD algorithms eliminate iterative bounding box proposals and feature resampling common to earlier objection detection algorithms. Convolutional filter layers applied to feature maps enable detection at multiple scales, yielding improved detection accuracy using a lower resolution input, which greatly improves computation speed. Embodiments of the disclosed face detection process execute 304 SSD to identify the portrait photo and the ghost photo. The disclosed face detection process is further configured with a limited number of convolutional layers, or nodes, resulting in a compact size and efficient computation speed. In one example embodiment, the resulting SSD model (the trained algorithm) consumes little memory (e.g., 5.7 MB) and executes in as little as 37 ms on certain processing units.

The disclosed image matching process employs multiple-scale template matching with an overlay mask to mitigate the effects of overlays arranged on the portrait photo or the ghost photo. Authentication processing system 200 applies 306 masks to overlays in the portrait photo and the ghost photo. Template matching algorithms generally operate to find a given "template" image within another "input" image. The disclosed image matching process employs template matching to find facial features within a ghost photo in a portrait photo, or facial features within a portrait photo in a ghost photo. Without the masks, the existence of an overlay in either the portrait photo or the ghost photo results in increased false positives and false negatives in identifying the facial features. Multiple-scale template matching enables detection of a template image in an input image regardless of the scale of any instance of the template within the input image. In other words, a template feature is identifiable in the input image regardless of the size of that feature in the input image.

The overlay masks are applied 306 to regions of the image identified as containing an overlay, resulting in the template matching process executing and excluding the masked regions from consideration. In this manner the template matching process avoids improperly keying on features of an overlay as opposed to the intended facial features in the ghost photo. Multiple-scale template matching is then executed 308 on the portrait photo and the ghost photo. Authentication processing system 200 detects 310 the ghost photo does not match the portrait photo when, for example, the facial features within a portrait photo are not detected in the ghost photo, i.e., the input photo, resulting in detecting the portrait photo is fraudulent.

Figure 4:
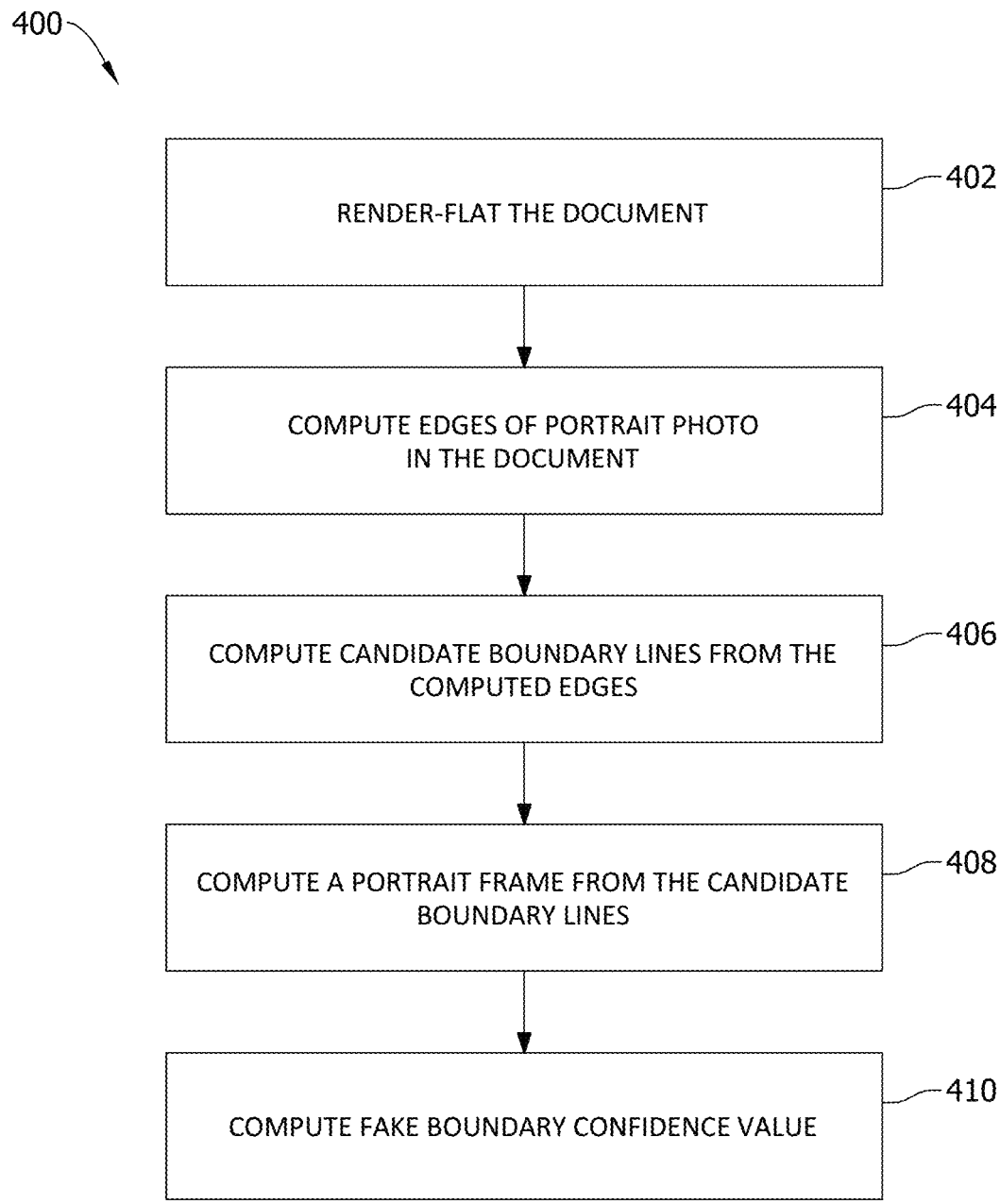
FIG. 4 is a flow diagram of an example method of detecting boundary discontinuities in a portrait photo on a document.

FIG. 4 is a flow diagram of an example method 400 of detecting boundary discontinuities in a portrait photo on a document, for example, by checking if the portrait photo has been physically substituted via rough cutting boundaries. The disclosed authentication processing systems, such as authentication processing system 200, detect and render-flat 402 the document. A captured image of the document is often not captured in a flat aspect. In other words, the document is not captured in a plane parallel to the plane of the capture device, lens, or sensor. Authentication processing system 200 detects the document in the captured image and renders the document in the plane parallel to the capture device, e.g., peripheral capture device 224.

Figure 5:
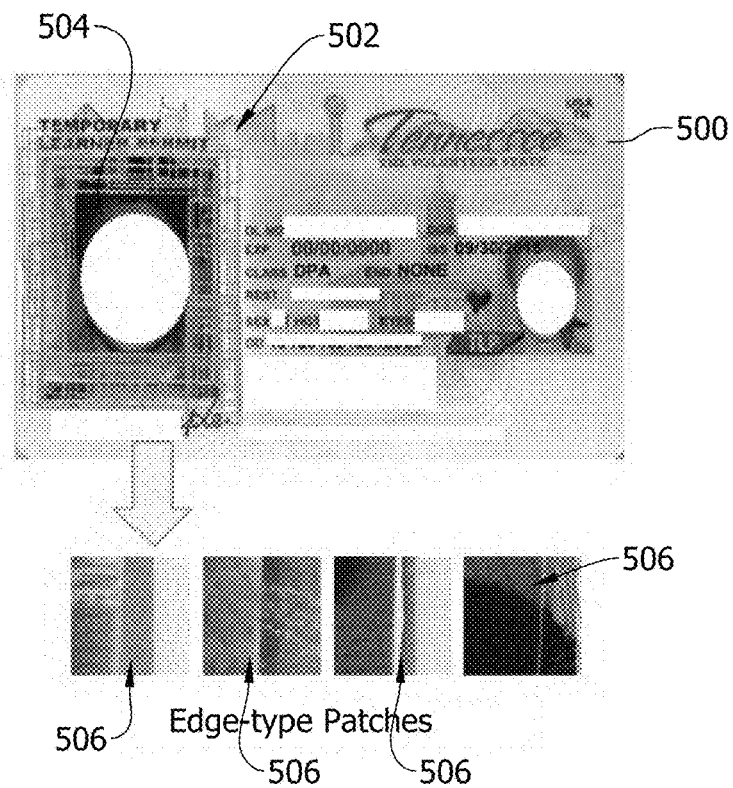
FIG. 5 is an illustration of an example document with local edge-type patches computed.

Authentication processing system 200 computes edges 404 in two ways, i.e., a dual-mode edge detection. One computation is by locating local patches around portrait boundaries using conventional image processing algorithms, such as a Canny edge detection algorithm. The Canny edge detection algorithm utilizes multiple steps, including applying a Gaussian filter to smooth the input portrait photo, computing intensity gradients for the image, applying gradient magnitude thresholding, applying a double threshold to determine potential edges, and completing the edge by suppressing weak segments and connecting strong segments. Canny edge detection algorithms are generally well known. In certain embodiments, color boundaries are introduced to further identify local edge patches. In alternative embodiments, other edge detection algorithms may be employed. FIG. 5 illustrates an example document 500 with a plurality of local patches 502 computed around a boundary of a portrait photo 504. Local patches 502 are defined by bounding boxes, each capturing a boundary segment 506 for evaluation.

Figure 6:
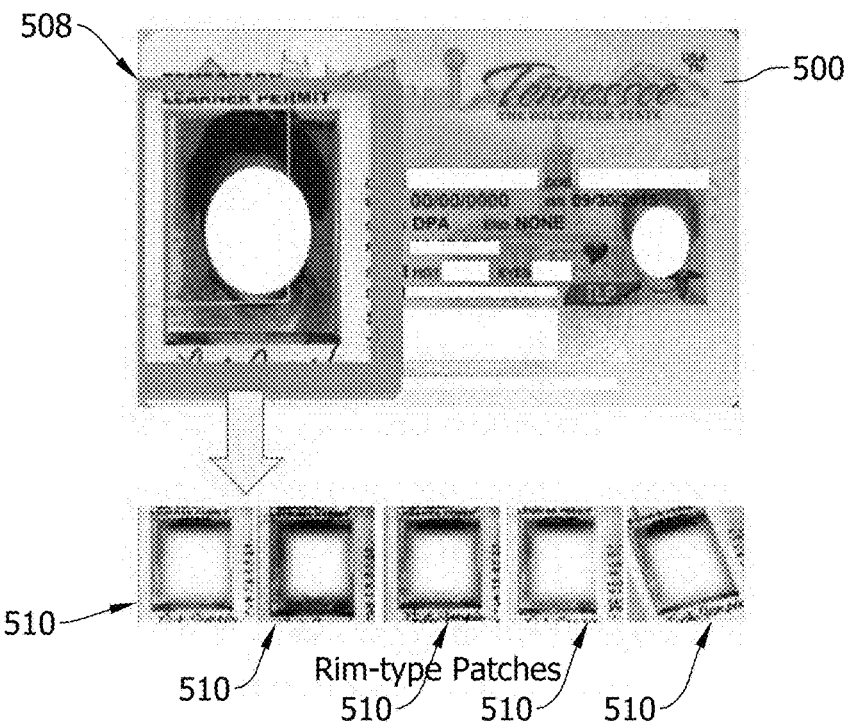
FIG. 6 is an illustration of the example document shown in FIG. 5 with rim-type patches computed.
Figure 7:
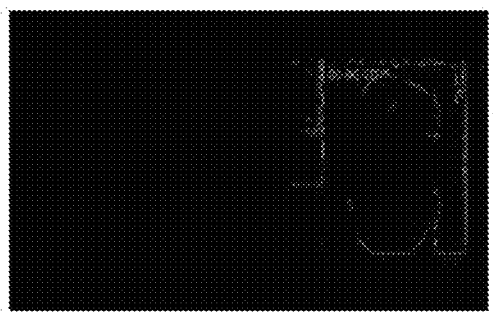
FIGS. 7-9 are illustrations of detected edges and how they are connected in a frame for an example true document.
Figure 10:
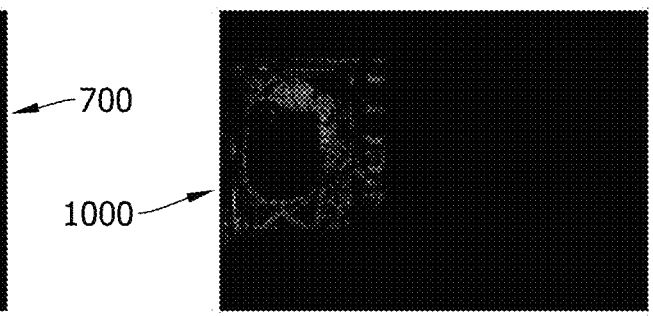
FIGS. 10-12 are illustrations of detected edges and how they are connected in a frame for an example fraudulent document.
Figure 8:
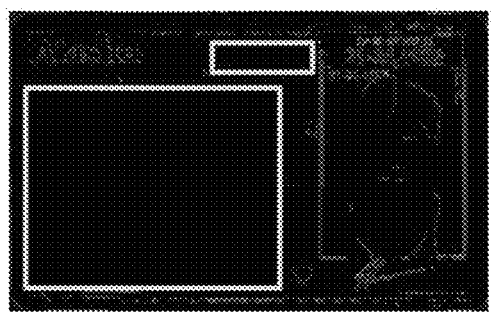
Figure 11:
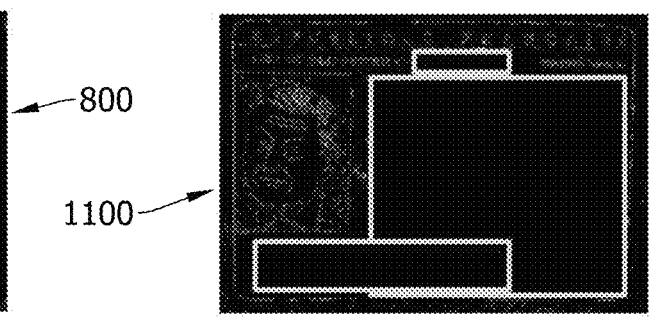
Figure 9:
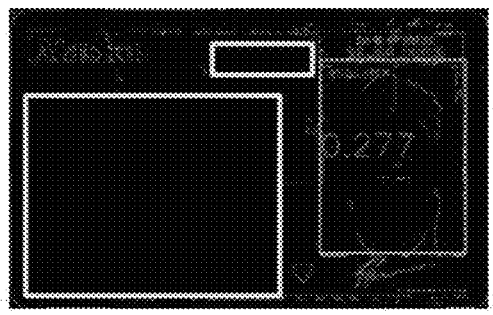
Figure 12:
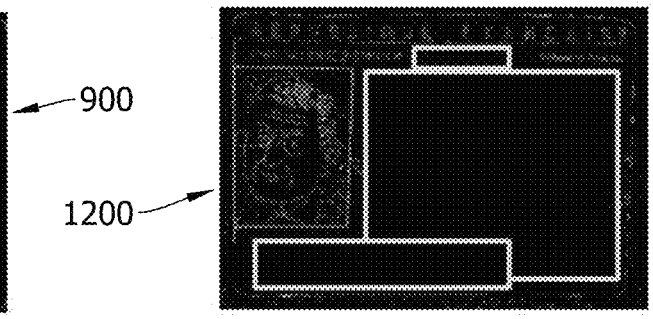

A second computation is to extract a global rim-type patch by computing a window around the portrait photo boundaries. FIG. 6 illustrates the example document 500 shown in FIG. 5 with a plurality of rim-type patches 508 computed around the boundary of portrait photo 504. Rim-type patches 508 are defined by bounding boxes, each representing a complete, or global, boundary 510 around portrait photo 504. The dual-mode edge computation improves edge detection for documents including double frames or slant frames, among other boundary features, that local edge detection performs poorly against. Authentication processing system 200 produces a set of coordinates or pixels as a result of computing edges of the portrait photo. The set typically does not define a continuous line and, instead, requires "connecting" between the various edge segments. FIGS. 7-9 illustrate an example true document's computed edges and how they are connected to define a frame according to embodiments of authentication processing system 200. FIGS. 10-12 illustrate an example fraudulent document's computed edges and how they are connected to define a frame according to embodiments of authentication processing system 200.

More specifically, FIG. 7 shows detected edges 700 of a true document's portrait photo. Likewise, FIG. 10 shows detected edges 1000 of a fraudulent document's portrait photo.

Authentication processing system 200 computes fit lines 406 representing the boundary lines using conventional image processing algorithms, such as a Hough transform. The Hough transform, for example, when applied to the detected edges, hypothesizes potential boundary lines extending through each detected edge. The true boundary lines, or the pixels in which they lie, in the portrait photo will generally accumulate more hypothesized boundary lines. The Hough transform identifies the true boundary lines by searching for local maxima among the pixels in the portrait photo. FIG. 8 illustrates computed candidate boundary lines 800, or Hough lines, for the portrait photo in the true document shown in FIGS. 7-9. FIG. 11 illustrates computed candidate boundary lines 1100, or Hough lines, for the portrait photo in the fraudulent document shown in FIGS. 10-12. In certain embodiments, authentication processing system 200 constrains the Hough transform implementation by limiting the length of the hypothesized lines and the angles at which they extend, which correspond to logical limits on the size of the portrait photo itself and, generally, that the boundaries are approximately vertical and horizontal. The algorithm may be further configured by increment size, slope constraints, or other parameters to tune performance.

Authentication processing system 200 computes a frame 408 based on the candidate boundary lines. First, authentication processing system 200 computes a portrait center based on identified region of interest for the portrait photo. Second, the fit lines, or candidate boundary lines, such as candidate boundary lines 800 or 1100 shown in FIGS. 8 and 11, are categorized as one of the four sides (top, bottom, left, right) based on the portrait center. Third, and because categorizing yields, for each category, i.e., for each side, multiple candidate boundary lines around the true boundary line, the fit lines for each category are merged. More specifically, candidate boundary lines within a category tend to cluster around and are substantially parallel to a true boundary line. Authentication processing system 200 detects such clusters as colinear or nearly colinear based on, for example, the colinearity or near colinearity of their respective endpoints. Then, fourth, the best line for each category is selected based on a measure of line clarity, e.g., "peakedness," to assess which fit lines are true boundary lines. Peakedness statistics can include metrics such as kurtosis, standard deviation, signal to noise ratio (SNR), effective line length, boundary separation, and peak deviation. The selected boundary line should be clear and should separate well from background noise. The statistics above can be used alone or combined to determine line clarity. For example, two or more measures could be averaged, such as a normalized kurtosis, line length normalized by expected length, and signal to noise ratio. Fifth, authentication processing system 200 computes the frame corners by computing intersection points of two or more of the selected best lines that are adjacent. FIG. 9 shows a computed frame 900 for the portrait photo of the true document shown in FIGS. 7-9. FIG. 12 shows a computed frame 1200 for the portrait photo of the fraudulent document shown in FIGS. 10-12.

Authentication processing system 200 computes a fake boundary confidence value 410. Given a computed frame boundary, certain properties are expected of a true boundary versus a fake boundary. For a first example, the computed frame should have square, or nearly square corners. Accordingly, authentication processing system 200 computes the angle between adjacent frame lines. If the computed angles are outside a tolerance range around 90 degrees, then authentication processing system 200 determines the frame is more likely to be a fake boundary. Otherwise, the computed frame is more likely a true boundary. Alternatively, confidence in the computed frame is a continuous computation in which confidence the computed frame is fake increases as the angles tend away from 90 degrees, and confidence the computed frame is true increases as the angles tend toward 90 degrees.

For a second example, the computed frame segments should have a length that is equal, or nearly equal, to the corresponding dimension of the region of interest for the portrait photo. Authentication processing system 200 computes a ratio of a segment length from the computed frame to the corresponding portrait region of interest dimension. If the computed ratio is outside a tolerance range around one, then authentication processing system 200 determines the frame is more likely to be a fake boundary. Otherwise, the computed frame is more likely a true boundary. Alternatively, confidence in the computed frame is a continuous computation in which confidence the computed frame is fake increases as the ratio tends away from one, and confidence the computed frame is true increases as the ratio tends toward one.

Figure 13:
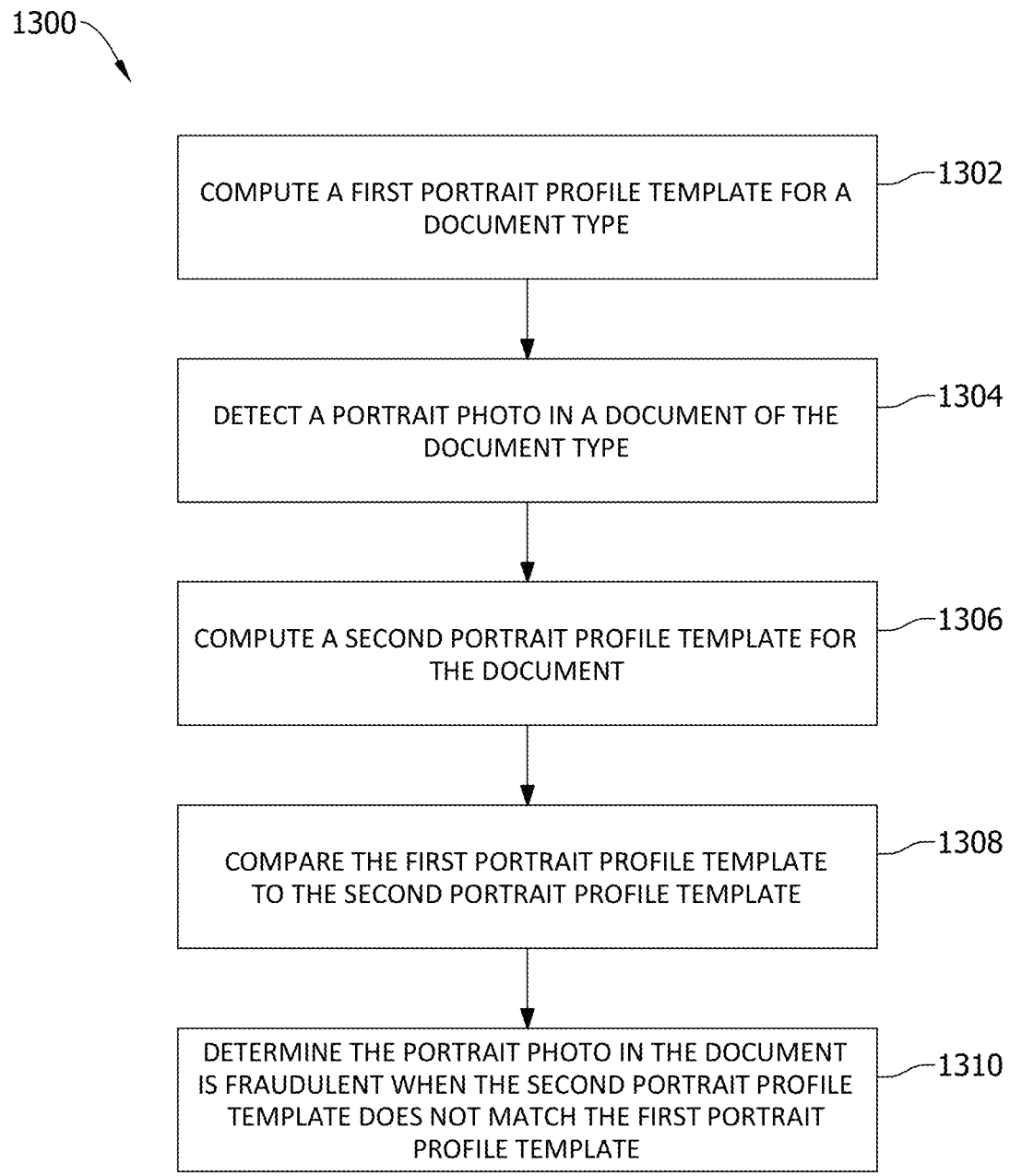
FIG. 13 is a flow diagram of an example method of detecting a portrait profile for a portrait photo on a document does not match a template portrait profile for the document type.

FIG. 13 is a flow diagram of an example method 1300 of detecting a portrait profile for a portrait photo on a document does not match a template portrait profile for the document type. Authentication processing systems 200 performs portrait fraud detection, for example, by creating a portrait profile template and comparing it against a stored profile for the document type. A document type may be limited, for example, to a given jurisdiction, such as a state or country. The profile template (a first portrait profile template) for a document type is generated 1302 by authentication processing system 200 or another processing system, such as a system of the issuing authority, and may include, for example, a background color, line styles, or security graphics. A fraudulent portrait photo may include a portrait background of the wrong color, portrait boundaries drawn with incorrect line styles (e.g., dashed, barred, dotted, etc.), or with missing or incorrect security graphics overlays. Authentication processing system 200, in certain embodiments, includes a portrait segmenter to build a database of portrait profiles for known jurisdiction classes by training with a training data set that includes portrait photos with appropriate background colors, line styles, and overlay graphics for a given jurisdiction, as well as under a variety of ambient illumination.

A presented document is processed by first detecting 1304 the portrait photo using a face detection algorithm such as those described above. Authentication processing system 200 then computes 1306 a second portrait profile template for the presented document. The first and second portrait profile templates are compared 1308 to determine whether the portrait photo is genuine or fraudulent. For example, authentication processing system 200 determines 1310 the portrait photo in the document is fraudulent when the second portrait profile template does not match the first portrait profile template.

The systems and methods described herein may be implemented using computer programming or engineering techniques including computer software, firmware, hardware or any combination or subset thereof, wherein the technical effects and specific improvements to the technology and technical field may include one or more of: (a) improving detection rates for face detection algorithms; (b) improving matching accuracy of template matching algorithms for portrait photo and ghost photo matching; (c) detecting fraudulent portrait photo boundaries; and (d) detecting fraudulent portrait photos in a document.

In the foregoing specification and the claims that follow, a number of terms are referenced that have the following meanings.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here, and throughout the specification and claims, range limitations may be combined or interchanged. Such ranges are identified and include all the sub-ranges contained therein unless context or language indicates otherwise.

Disjunctive language such as the phrase "at least one of X, Y, or Z," unless specifically stated otherwise, is generally understood within the context as used to state that an item, term, etc., may be either X. Y, or Z, or any combination thereof (e.g., X, Y, and/or Z). Thus, such disjunctive language is generally not intended to imply certain embodiments require at least one of X, at least one of Y, and at least one of Z to each be present. Additionally, conjunctive language such as the phrase "at least one of X, Y, and Z," unless specifically stated otherwise, should be understood to mean any combination of at least one of X, at least one of Y, and at least one of Z.

Some embodiments involve the use of one or more electronic processing or computing devices. As used herein, the terms "processing unit" and "processor" and related terms, e.g., "processing device," "computing device," and "controller" are not limited to just those integrated circuits referred to in the art as a computer, but refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processing unit, processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable and include any computer program stored in memory for execution by personal computers, tablets, workstations, mobile devices, clients, and servers. Such instructions, when executed by a processor, cause, or "configure," the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

The systems and methods described herein are not limited to the specific embodiments described herein, but rather, components of the systems and/or steps of the methods may be utilized independently and separately from other components and/or steps described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An authentication processing system, comprising:
   a memory storing a portrait fraud detection application; and
   a processing unit coupled with the memory and configured to execute the portrait fraud detection application, the portrait fraud detection application, when executed, configuring the processing unit to:
      receive a capture of a document including a portrait photo and at least one overlay;
      detect a face within the portrait photo among the at least one overlay in the capture;
      determine the portrait photo is fraudulent, wherein the processing unit determines the photo is fraudulent by:
         rendering-flat the document;
         computing edges of the portrait photo within the document;
         computing candidate boundary lines from the edges;
         computing a portrait frame from the candidate boundary lines; and
         computing a fake boundary confidence value for the portrait frame, the fake boundary confidence value exceeding a threshold to determine the portrait photo is fraudulent; and
      initiate an indication the document is fraudulent.

2. The authentication processing system of claim 1, wherein the processing unit detects the face within portrait photo using a single shot detector (SSD) algorithm.

3. The authentication processing system of claim 2, wherein the processing unit is further configured to train the SSD algorithm using sample portrait photos having overlays.

4. The authentication processing system of claim 3, wherein the processing unit determines the portrait photo is fraudulent further by:
   executing the SSD algorithm to detect a ghost photo in the document;
   applying masks to the one or more overlays in the portrait photo and the ghost photo;
   executing a template matching algorithm to match the portrait photo and the ghost photo; and
   detecting the ghost photo does not match the portrait photo.

5. The authentication processing system of claim 1, wherein computing edges of the portrait photo comprises computing local-type edges and rim-type edges.

6. The authentication processing system of claim 1, wherein the processing unit determines the portrait photo is fraudulent further by:
   computing a first portrait profile template for a document type corresponding to the document received;
   computing a second portrait profile template for the document;
   comparing the first portrait profile template to the second portrait profile template; and
   determining the portrait photo is fraudulent when the first portrait profile template does not match the second portrait profile.

7. The authentication processing system of claim 1, wherein the memory and the processing unit are components of a mobile device.

8. The authentication processing system of claim 1, wherein the at least one overlay comprises an overlay selected from the group consisting of:
   text,
   a hologram, and
   a security pattern.

9. A method of detecting a fraudulent portrait photo in a document, the method comprising:
   receiving a capture of a document including a portrait photo;
   detecting a face within the portrait photo in the capture;
   determining the portrait photo is fraudulent, wherein determining the portrait photo is fraudulent comprises:
      rendering-flat the document;
      computing edges of the portrait photo within the document;
      computing candidate boundary lines from the edges;
      computing a portrait frame from the candidate boundary lines; and
      computing a fake boundary confidence value for the portrait frame, the fake boundary confidence value exceeding a threshold to determine the portrait photo is fraudulent; and
   initiating an indication the document is fraudulent.

10. The method of claim 9, wherein detecting the face within the portrait photo comprises using a single shot detector (SSD) algorithm.

11. The method of claim 10, wherein detecting the face within the portrait photo further comprises training the SSD algorithm using sample portrait photos having overlays.

12. The method of claim 11, wherein determining the portrait photo is fraudulent further comprises:
executing the SSD algorithm to detect a ghost photo in the document;
applying masks to overlays in the portrait photo and the ghost photo;
executing a template matching algorithm to match the portrait photo and the ghost photo; and
detecting the ghost photo does not match the portrait photo.

13. The method of claim 9, wherein computing edges of the portrait photo comprises computing local-type edges and rim-type edges.

14. The method of claim 9, wherein determining the portrait photo is fraudulent further comprises:
computing a first portrait profile template for a document type corresponding to the document received;
computing a second portrait profile template for the document;
comparing the first portrait profile template to the second portrait profile template; and
determining the portrait photo is fraudulent when the first portrait profile template does not match the second portrait profile.

15. A method of detecting a fraudulent portrait photo boundary in a document, the method comprising:
rendering-flat the document;
computing edges of a portrait photo within the document;
computing candidate boundary lines from the edges;
computing a portrait frame from the candidate boundary lines; and
computing a fake boundary confidence value for the portrait frame, the fake boundary confidence value exceeding a threshold to determine the portrait photo is fraudulent.

16. The method of claim 15, wherein computing edges of the portrait photo comprises computing local-type edges and rim-type edges.

17. The method of claim 15, wherein computing candidate boundary lines comprises applying a Hough transform to the edges to identify true edges of the portrait photo.

18. The method of claim 15, wherein computing the portrait frame comprises:
computing a portrait center based on a region of interest for the portrait photo;
categorizing the candidate boundary lines as top, bottom, left, or right based on the portrait center;
merging the candidate boundary lines within each category;
selecting the best boundary line for each category based on peakedness; and
computing frame corners based on computed intersection points of two or more of the best boundary lines.

19. The method of claim 15, wherein computing a fake boundary confidence value comprises computing a value based on angles computed between adjacent frame boundary lines.

20. The method of claim 15, wherein computing a fake boundary confidence value comprises computing a value based on a ratio of a segment length from the portrait frame to a corresponding portrait region of interest dimension.

* * * * *